United States Patent
Okamoto (10) Patent No.: US 7,750,287 B2
(45) Date of Patent: Jul. 6, 2010

(54) TEMPERATURE CONTROL APPARATUS AND METHOD, AND PROGRAM

(75) Inventor: Koji Okamoto, Kanagawa (JP)

(73) Assignee: Sony Corporation (JP)

( * ) Notice: Subject to any disclaimer, the term of this patent is extended or adjusted under 35 U.S.C. 154(b) by 68 days.

(21) Appl. No.: 11/975,708

(22) Filed: Oct. 19, 2007

(65) Prior Publication Data
US 2008/0128588 A1   Jun. 5, 2008

(30) Foreign Application Priority Data
Oct. 20, 2006   (JP) ............................ P2006-285830

(51) Int. Cl.
*H01J 7/24*   (2006.01)
(52) U.S. Cl. ........................ 250/238; 355/30
(58) Field of Classification Search ............... 250/238, 250/205, 214 R, 214 C; 355/30, 53, 68
See application file for complete search history.

(56) References Cited

U.S. PATENT DOCUMENTS 5,864,386 A * 1/1999 Nei ............................ 355/30

2004/0113060 A1 * 6/2004 Nabeyama et al. .......... 250/238

FOREIGN PATENT DOCUMENTS

| JP | 62-280915 A | 12/1987 |
|----|----|----|
| JP | 7-325281 A | 12/1995 |
| JP | 8-014723 A | 1/1996 |
| JP | 10-050588 A | 2/1998 |
| JP | 10-318624 A | 12/1998 |
| JP | 11-173727 A | 7/1999 |
| JP | 2003-299435 A | 10/2003 |
| JP | 2005-026473 A | 1/2005 |
| JP | 2005-250249 A | 9/2005 |
| JP | 2005-331230 A | 12/2005 |
| JP | 2006-005212 A | 1/2006 |
| JP | 2006-055032 A | 3/2006 |
| JP | 2006-183882 A | 7/2006 |

* cited by examiner

*Primary Examiner*—Kevin Pyo
(74) *Attorney, Agent, or Firm*—Lerner, David, Littenberg, Krumholz & Mentlik, LLP

(57) ABSTRACT

A temperature control apparatus is provided which may control temperature of an optical component that operates upon receipt of light from a light source. The apparatus may include a light quantity detector which detects a quantity of light based on the light source; and a temperature regulator which performs regulating operation for regulating the temperature of the optical component on the basis of the light quantity detected by the light quantity detector.

6 Claims, 7 Drawing Sheets

TEMPERATURE CONTROL APPARATUS AND METHOD, AND PROGRAM

CROSS-REFERENCE TO RELATED APPLICATIONS

This application claims priority from Japanese Patent Application No. JP 2006-285830 filed in the Japanese Patent Office on Oct. 20, 2006, the entire content of which is incorporated herein by reference.

BACKGROUND OF THE INVENTION

1. Field of the Invention

The present invention relates generally to a temperature control apparatus and method, and a program. In particular, the invention relates to a temperature control apparatus and method that can appropriately perform temperature control on an optical component regardless of the type thereof, and to a program therefore.

2. Description of the Related Art

Apparatuses (e.g. the apparatus described in Japanese Patent Laid-open No. 2005-250249) mounted with components, such as prisms, liquid crystal panels, etc. (hereinafter referred to as the optical components) which operate upon receipt of light have widely been used.

Such optical components are exposed to thermal load resulting mainly from conversion of light into heat. Thus, the optical components have a feature of deterioration due to the thermal load.

On the other hand, it is desirable that the optical components maintain temperatures higher than a certain level in view of performance. In other words, the optical components have another feature in which they do not sufficiently exhibit their optical performance if used at low temperatures.

Because of the two features described above, the optical components need to maintain their optimum temperatures. To meet the need, temperature control has heretofore been performed on the optical components in some cases.

Figure 1:
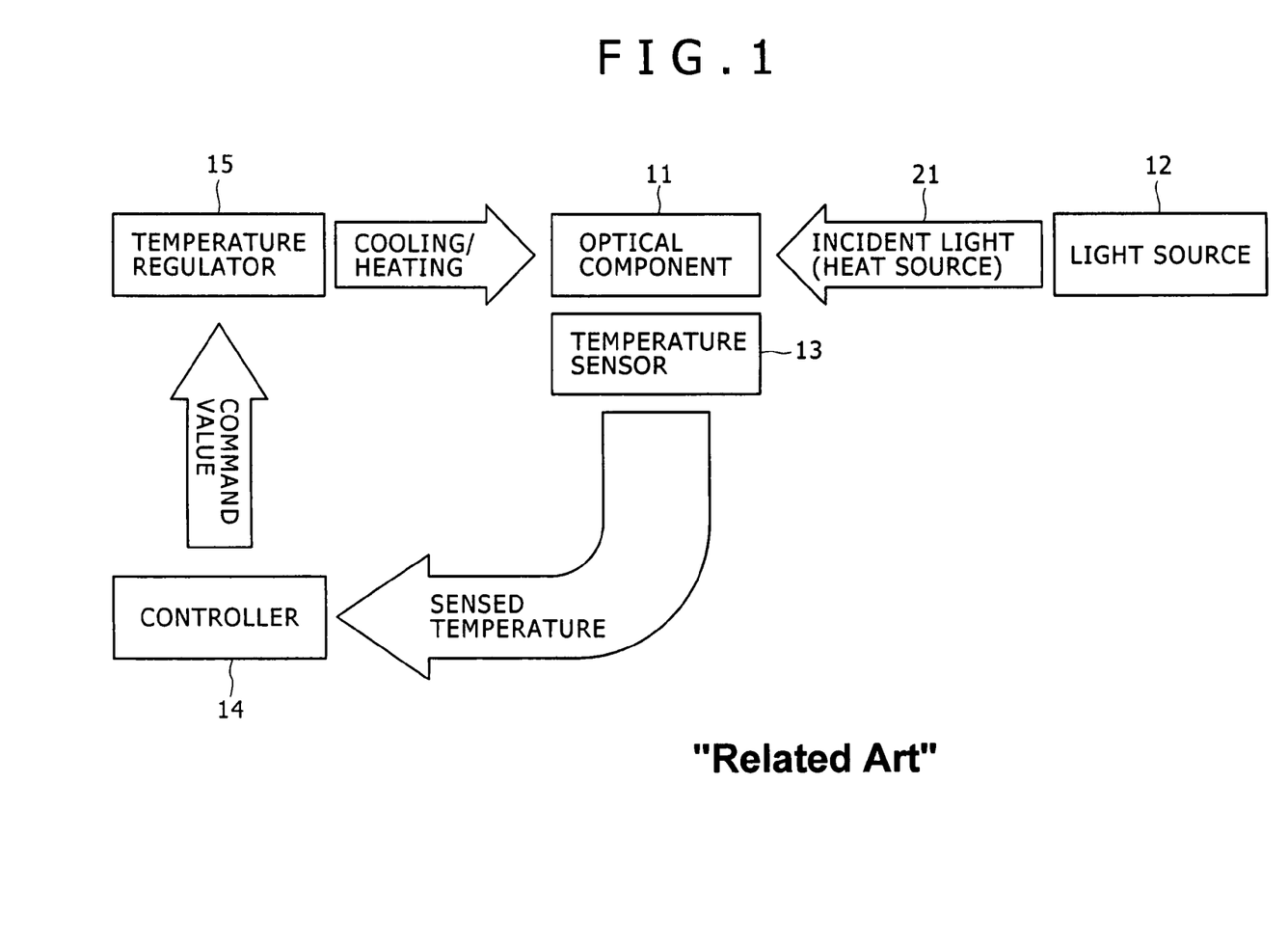
FIG. 1 is a block diagram illustrating the configuration of an existing temperature control system by way of example.

For example, FIG. 1 illustrates an example of the configuration of an existing temperature control system (hereinafter, referred to as the existing system) for performing temperature control on an optical component.

The existing system of FIG. 1 is configured to include an optical component 11 through a temperature regulator 15.

The optical component 11 operates upon receipt of incident light 21 from a light source 12. The incident light 21 serves as a heat source to raise the temperature of the optical component 11.

The existing system of FIG. 1 includes a temperature sensor 13, a controller 14 and a temperature regulator 15, which constitutes a control sub-system (hereinafter referred to as the existing temperature control sub-system) for performing temperature control on the optical component 11.

The temperature sensor 13 is installed in close contact with or around the optical component 11 and senses the temperature of the installation site.

The controller 14 uses the temperature sensed by the temperature sensor 13 to create a command value for the temperature regulator 15. For example, the controller 14 creates, as a command value, a value corresponding to an error (temperature difference) of the sensed temperature relative to a control target value.

The temperature regulator 15 performs operation for raising the temperature of the optical component 11 (hereinafter, referred to as the heating operation) or operation for lowering the temperature of the optical component 11 (hereinafter, referred to as the cooling operation) in response to the command value from the controller 14.

In the present specification, "heating" is a comprehensive concept containing positively applying heat to an object (here, the optical component 11) as well as increasing the temperature of the object to an ambient temperature without application of heat in the case where the temperature of the object is lower than the ambient temperature, for example. In other words, the "heating" simply implicates provision of a factor increasing the temperature of the object. Similarly, "cooling" is an antonym of the "heating" and simply implicates provision of a factor lowering the temperature of the object.

Such an existing temperature control sub-system uses the temperature sensed by the temperature sensor 13 as a feedback value, that is, performs the so-called feedback control so as to eliminate the error (temperature difference) of the sensed temperature relative to the control target value, that is, to make the sensed temperature correspond to the control target value. Specifically, if the error is a positive value for instance, that is, if the sensed temperature is lower than the control target value, a value (e.g. a positive value) instructing the heating operation is given to the temperature regulator 15 as a command value. Thus, the temperature regulator 15 performs the heating operation. In contrast, if the error is a negative value, that is, if the sensed temperature is higher than the control target value, a value (e.g. a negative value) instructing the cooling operation is given to the temperature regulator 15 as a command value. Thus, the temperature regulator 15 performs the cooling operation. When it is judged that the error is zero, that is, when it is judged that the sensed value corresponds to the control target value, for example zero is given to the temperature regulator 15 as a command value. Thus, the cooling/heating operation by the temperature regulator 15 is stopped. This brings the existing temperature control sub-system into a stable state.

As described above, the existing temperature control sub-system uses the temperature sensed by the temperature sensor 13 as the temperature of the optical component 11, sets the optimum temperature of the optical component 11 as the control target value, and performs control to make the sensed temperature correspond to the control target value. In this way, the temperature control is performed on the optical component 11.

SUMMARY OF THE INVENTION

However, the control object to be subjected to the temperature control is essentially not the installation site of the temperature sensor 13, that is, not the external surface or surrounding of the optical component 11. It is the inside of the optical component 11 where it is substantially impossible to install the temperature sensor 13, particularly, an internal portion of the optical component 11 on which a quantity of light is concentrated.

It is assumed that the correlation between temperature at the internal portion of the optical component 11 (hereinafter, referred to as the internal temperature) and temperature at the installation site of the temperature sensor 13 (hereinafter, referred to as the external temperature) is preliminarily grasped. The optimum external temperature is calculated back from the optimum internal temperature based on the correlation so that it can preliminarily be set as a control target value. In this case, control is exercised to make the sensed temperature of the temperature sensor 13 (the external temperature at the time of the detection) correspond to the control target value, so that the internal temperature can approximately be maintained at the optimum temperature. In short, under this assumption, even the existing temperature control sub-system enables appropriate temperature control.

However, such an assumption may not be established depending on the type of the optical component 11.

For example, the optical component 11 may be composed of a part having a large temperature difference between the internal temperature and the external temperature, such as a prism used in a high-intensity projector. In such a case, it is very difficult to preliminarily grasp the correlation between the internal temperature and the external temperature. Consequently, it is substantially impossible to calculate back the optimum external temperature from the optimum internal temperature. A proper temperature may have to be set as a control target value. Accordingly, even if control is exercised to make the sensed temperature of the temperature sensor 13 (the external temperature at the time of the detection) correspond to the control target value, there is no guarantee that the internal temperature is maintained at the optimum temperature. It is likely that the internal temperature exceeds the optimum temperature to expose the excessive thermal load to the optical component 11. In short, the existing temperature control sub-system cannot exercise the appropriate temperature control on the optical component 11 in some types of the optical component 11.

Further, the optical component 11 may be composed of an optically-transparent part, specifically, e.g. a transparent liquid crystal device, a PS conversion device or the like. In such a case, it may be impossible to attach the temperature sensor 13 to the part as well as to measure the temperature of the part in a non-contact manner with thermography or the like. In short, even the existing temperature control sub-system cannot be constructed in some types of the optical component 11. Consequently, temperature control cannot be exercised at all.

It is desirable to appropriately exercise temperature control regardless of the type of an optical component.

According to an aspect of the present invention, there is provided a temperature control apparatus for controlling temperature of an optical component that operates upon receipt of light from a light source. The apparatus may include a light quantity detector which detects a quantity of light based on the light source; and a temperature regulator which performs regulating operation for regulating the temperature of the optical component on the basis of the light quantity detected by the light quantity detector.

The light quantity detector may detect a quantity of unnecessary light generated by the light source, as the quantity of light based on the light source.

The light quantity detector may detect, as the quantity of light based on the light source, a quantity of light leaking from the optical component on which light from the light source is incident.

The temperature control apparatus may further include a controller which creates a control command for the temperature regulator from the light quantity detected by the light quantity detector according to a predetermined control principle using the quantity of light based on the light source. The temperature regulator may perform the regulating operation according to the control command issued from the controller.

According to another aspect of the present invention, there is provided a temperature control method for a temperature control apparatus for controlling temperature of an optical apparatus that operates upon receipt of light from a light source, which may include detecting a quantity of light based on the light source; and regulating the temperature of the optical component on the basis of the light quantity detected.

According to further aspect of the present invention, there is provided a program performed by a computer which exercises control on a temperature regulator which performs regulating operation for regulating temperature of an optical component which operates upon receipt of light from a light source, which may include obtaining a light quantity detected by a light quantity detector for detecting a quantity of light based on the light source; and controlling the regulating operation of the temperature regulator on the basis of the light quantity obtained.

In the temperature control apparatus and method, and the program according to the respective aspects of the presenting invention, when the temperature of the optical component which operates upon receipt of light from the light source is controlled, the quantity of light based on the light source may be detected, and the temperature of the optical component may be regulated based on the light quantity detected.

As described above, the present invention may realize the temperature control of the optical component which operates upon receipt of light from the light source. In particular, the temperature control may appropriately be exercised regardless of the types of the optical component.

DETAILED DESCRIPTION

Embodiments of the present invention will be described below. The correspondence relationship between constituent elements described in claims and specific examples described in the specification and drawings is as below. This description is for confirming that specific examples supporting the invention described in the claims are described in the specification and drawings. There may be a specific example which is described in the specification and drawings but not described as one corresponding to a constituent element. However, this does not mean such a specific example does not correspond to the constituent element. In contrast, there may be a specific element which is described herein as one corresponding to a constituent element. However, this does not mean such a specific example does not correspond to a constituent element other than the constituent element as above.

Further, this description does not mean that the invention corresponding to a specific example described in the specification and drawings is described in all claims. In other words, this description does not deny the presence of the invention that corresponds to a specific example described in the specification and drawings but is not described in the claims of this application, namely, the presence of the invention that will be filed as a divisional application or added by amendment in the future.

Figure 2:
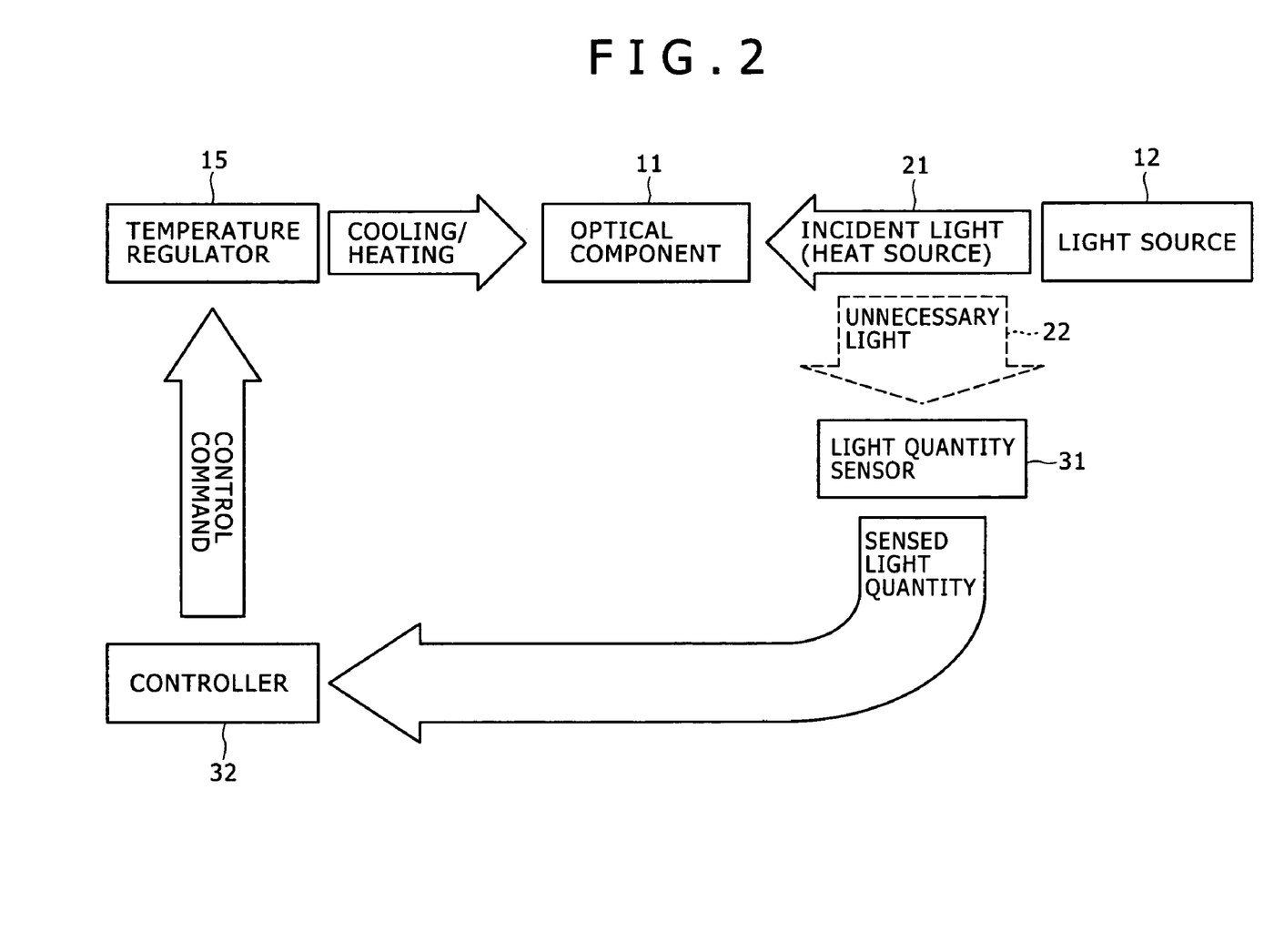
FIG. 2 is a block diagram illustrating the configuration of a temperature control system according to an embodiment of the present invention.
Figure 4:
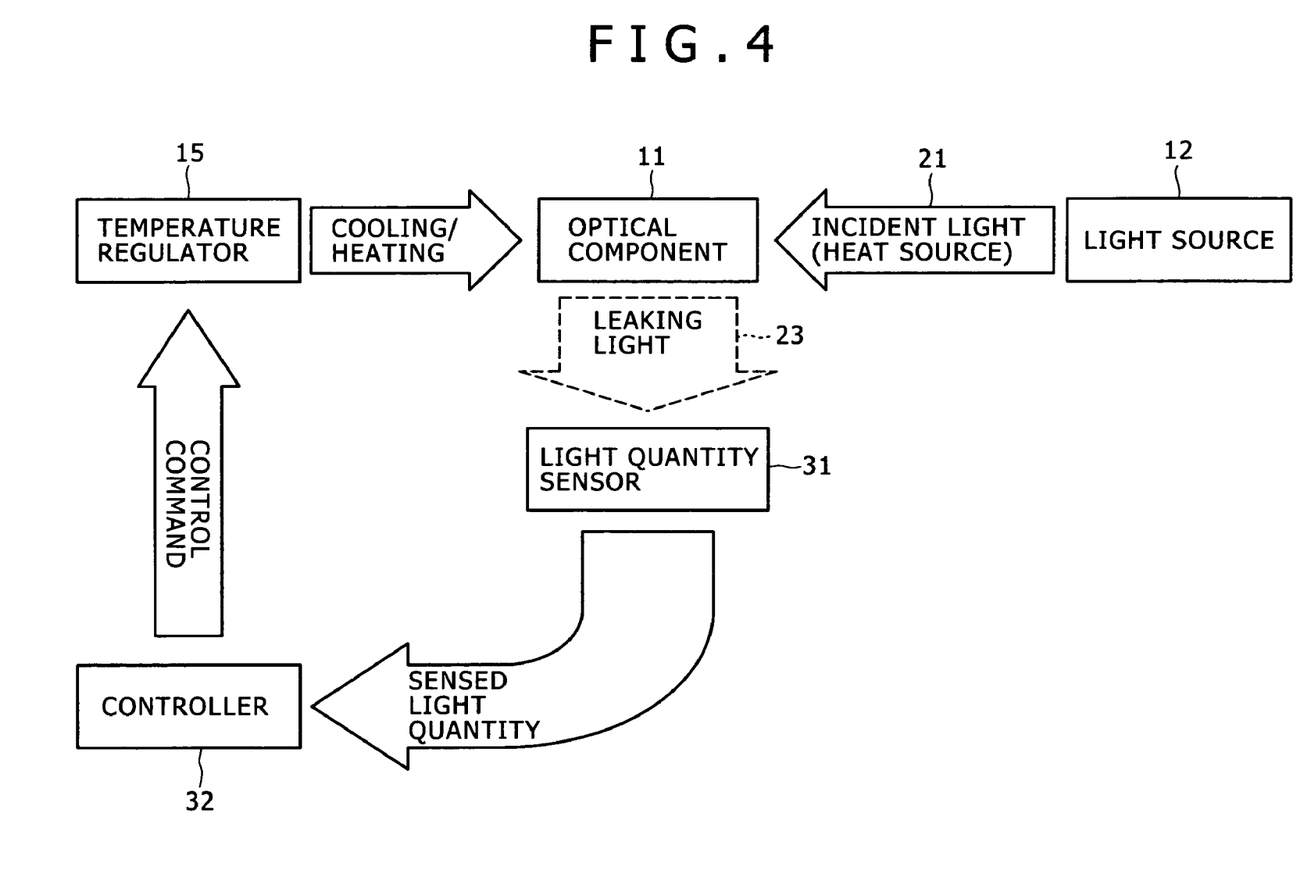
FIG. 4 is a block diagram illustrating a temperature control system according to another embodiment of the invention, different from the embodiment of FIG. 2.

According to an aspect of the present invention, there is provided a temperature control apparatus (e.g. the temperature control apparatus (system) of FIG. 2 or 4) for controlling temperature of an optical apparatus (e.g. the optical component 11 of FIG. 2 or 4) that operates upon receipt of light from a light source (e.g. the light source 12 of FIG. 2 or 4), including: a light quantity detector (e.g. the light quantity sensor 31 of FIG. 2 or 4) which detects a quantity of light based on the light source; and a temperature regulator (e.g. the temperature regulator 15 of FIG. 2 or 4) which performs regulating operation for regulating the temperature of the optical component on the basis of the light quantity detected by the light quantity detector.

The light quantity detector detects a quantity of unnecessary light (e.g. the unnecessary light 22 of FIG. 2 or 3) generated by the light source, as the quantity of light based on the light source.

The light quantity detector detects a quantity of light (e.g. the leaking light 23 of FIG. 4 or 5) leaking from the optical component on which light from the light source is incident, as the quantity of light based on the light source.

The temperature control apparatus further includes a controller (e.g. the controller 32 of FIG. 2 or 4) which creates a control command for the temperature regulator from the light quantity detected by the light quantity detector according to a predetermined control principle using the quantity of light based on the light source. The temperature regulator performs the regulating operation according to the control command issued from the controller.

According to another aspect of the present invention, there is provided a temperature control method for a temperature control apparatus (e.g. the temperature control apparatus (system) of FIG. 2 or 4) for controlling temperature of an optical component (e.g. the optical component 11 of FIG. 2 or 4) that operates upon receipt of light from a light source, including the steps (e.g. the processing of the temperature control system of FIG. 6) of: detecting a quantity of light based on the light source; and regulating the temperature of the optical component on the basis of the light quantity detected.

Figure 7:
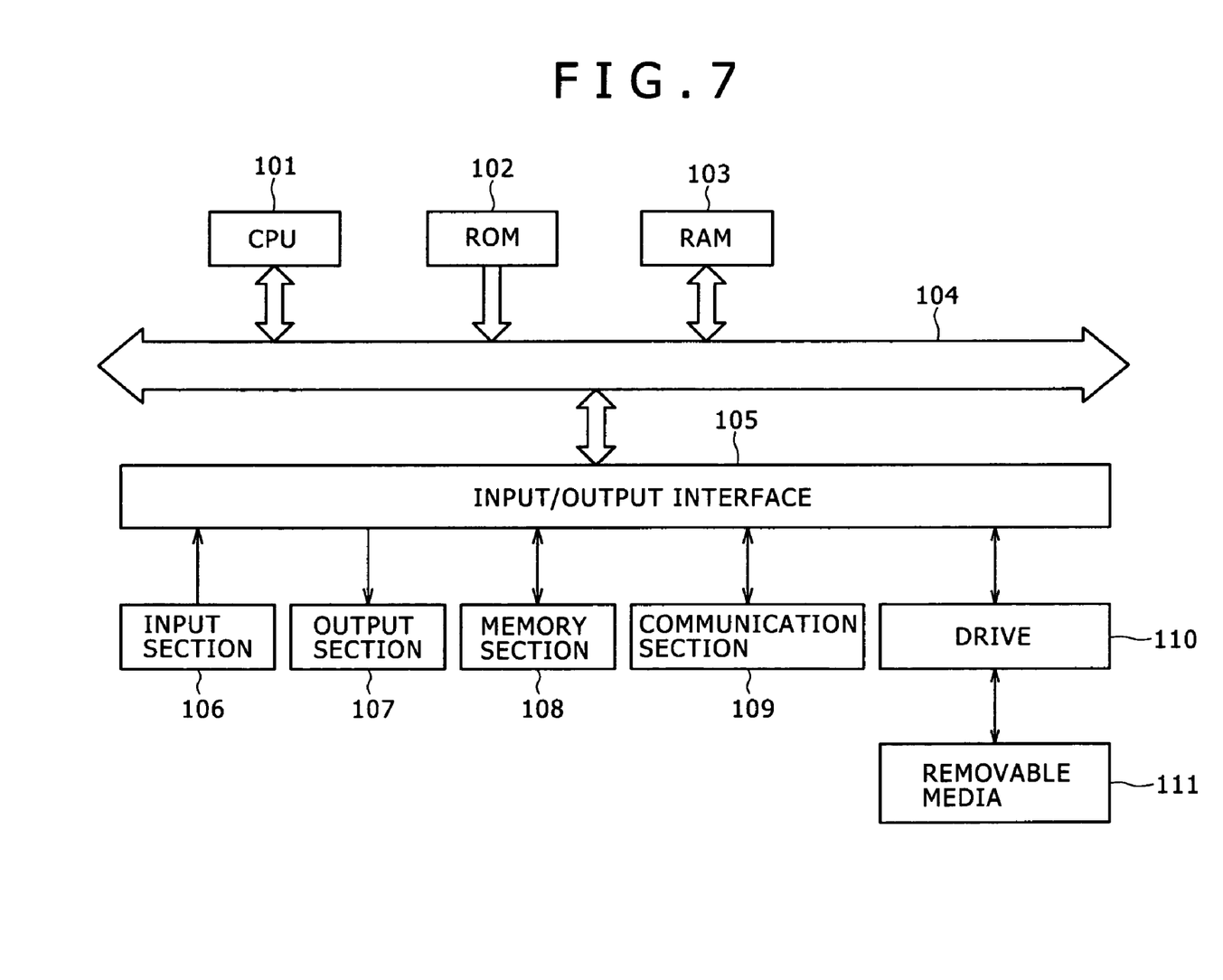
FIG. 7 is a block diagram illustrating the configuration of a computer used when processing embodying the present invention is executed through software by way of example.

A program according to further aspect of the present invention is a program which corresponds to the temperature control method according to the aspect of the present invention described above and which is performed by e.g. the computer of FIG. 7.

A description is made of a technique to which the present invention is applied (hereinafter, referred to as the technique of the invention) before the description of embodiments of the present invention.

As described above, in the case of performing temperature control on the optical component, the control object to be subjected to the temperature control is not the external surface or surrounding of the optical component where the temperature sensor can be installed. It is the inside of the optical component, particularly, an internal portion of the optical component on which a light quantity is concentrated.

A factor raising the temperature of the internal portion, namely, the heat source is light incident on the optical component from the light source as described above. The increasing degree of temperature depends on a quantity of incident light. Specifically, the more a quantity of incident light, the higher the increasing degree of the temperature of the internal portion.

Then, the present inventor has invented a technique for using not the temperature sensed by the temperature sensor or the like but a quantity of light based on a light source which is a direct factor to increase the temperature of an optical component as a detectable amount (observable amount) used to perform temperature control on the optical component (more accurately, the internal portion thereof).

In this case, the light based on the light source is a comprehensive concept including unnecessary light generated by the light source and light leaking from the optical component on which light is incident, as well as light incident on the optical component.

FIG. 2 illustrates the configuration of an embodiment of a temperature control system to which such a technique of the present invention is applied.

This system here refers to the entire apparatus composed of a plurality of processing devices and processing sections. In other words, the temperature control system of FIG. 2 can be grasped as one temperature control apparatus. This applies to another temperature control system of FIG. 4 and the like described later to which the present invention is applied.

Portions corresponding to those in the existing system of FIG. 1 are denoted with like reference numerals in the temperature control system of FIG. 2. Such portions are already described in the paragraph "Background of the Invention" and the like; therefore, the explanations are appropriately omitted.

As with the existing system of FIG. 1, the temperature control system of FIG. 2 includes the optical component 11, the light source 12 and the temperature regulator 15. In addition, the temperature control system of FIG. 2 includes a light quantity sensor 31 and a controller 32 instead, respectively, of the temperature sensor 13 and the controller 14 of the existing system in FIG. 1.

The temperature control system of FIG. 2 does not need the temperature measurement as related one because the technique of the invention is applied thereto. Accordingly, examples of the optical component 11 as a control target include various optical components inappropriate for the existing system of FIG. 1, such as a reflective liquid crystal device, a transmission type liquid crystal device, and an optical prism. In short, the types of the optical component 11 are not particularly restrictive.

The light quantity sensor 31 is composed of e.g. a photo sensor or the like to detect a quantity of light based on the light source 12.

Figure 3:
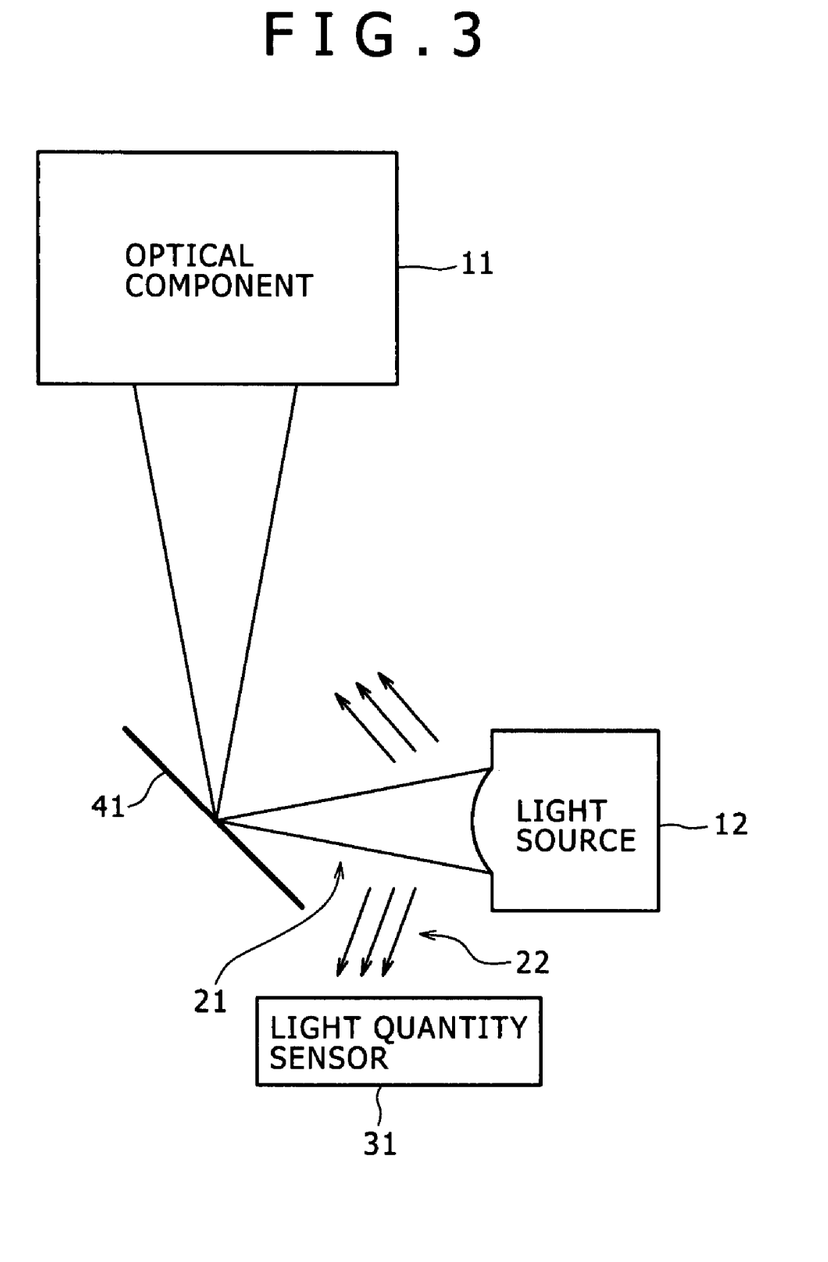
FIG. 3 illustrates an example of the arrangement position of a light quantity sensor of FIG. 2.

The temperature control system of FIG. 2 employs unnecessary light 22 from the light source 12 as the light based on the light source 12. In other words, the light quantity sensor 31 of FIG. 2 is installed at a site where a quantity of the unnecessary light 22 is detectable, for instance, on the periphery of a light path of the incident light 21 extending from the light source 12 to the optical component 11. More specifically, as shown in FIG. 3, the incident light 21 is emitted from the light source 12, reflected by the reflection plate 41 and directed to the optical component 11. In other words, the light source 12, the reflection plate 41 and the optical component 11 constitute the light path of the incident light 21. In such a case, the light quantity sensor 31 is installed at a position between the light source 12 and the reflection plate 41 so as not to interfere with the incident light 21. Thus, the light quantity sensor 31 can detect the unnecessary light 22.

Referring again to FIG. 2, the controller 32 is composed of e.g. dedicated hardware equipment, a computer or the like. The controller 32 makes use of the sensed quantity of light to create a control command to the temperature regulator 15 under a predetermined control principle.

The predetermined control principle here is not particularly restrictive as long as it is a principle using a quantity of light (the unnecessary light 22 of FIG. 2 or the leaking light 23 of FIG. 4 described later) based on the light source 12. Specifically, the present embodiment adopts a control principle in which the controller 32 preliminarily retains the correspondence relationship (correlation) between quantities of light based on the light source 12 and control commands and outputs a control command corresponding to a sensed quantity of light according to the correspondence relationship.

In this case, the correspondence relationship (correlation) between quantities of the unnecessary light 22 and control commands can preliminarily be grasped with ease as below for example. The correlation between the quantity of the incident light 21 which is a light source of the optical component 11 and the quantity of the unnecessary light 22 can easily be obtained. It is easy to conduct a test in advance as to how the temperature regulator 15 performs cooling/heating operation in order to maintain the optical component 11 at the optimum temperature when the incident light 21 has a predetermined quantity of light. A preliminary test is conducted while varying the quantity of the incident light 21. The results of the preliminary test and the correlation between the quantity of the incident light 21 and the unnecessary light 22 are used. In this way, the correspondence relation between the quantities of the unnecessary light 22 and the associated control commands can easily be grasped. This applies to the case where light other than the unnecessary light 22, e.g., the leaking light 23 of FIG. 4 described later or the like is employed as the light based on the light source 12.

The reason why the output of the controller 32 is not a command value as of the existing controller 14 (FIG. 1) but a control command is the following. It is not always true that the controller 32 outputs mere the same value as the command value even upon receipt of the same sensed quantity of light.

It is assumed that a preliminary test result is obtained in which it is more preferable that temperature control be exercised according to the predetermined control pattern when the quantity of the incident light 21 is equal to a given level. It is more specifically assumed that the control pattern obtained from the preliminary test result is such that strong cooling operation is performed at first and weak cooling operation is performed after a lapse of a predetermined time. In this case, if the predetermined quantity of light is given as a sensed quantity of light, the controller 32 outputs a first value indicating the weak cooling operation as a command value during a lapse of predetermined time and outputs a second value indicating the strong cooling operation as a command value after the lapse of predetermined time. Alternatively, if a function of performing cooling/heating operation according to the control pattern is mounted on the temperature regulator 15, the controller 32 can output the control pattern itself to the temperature regulator 15. As described above, even if receiving the same sensed quantity of light, the controller 32 can output mere the same value as the command value as well as a temporarily changed command value. In addition, the controller 32 can output various types of commands (the control pattern in the above-mentioned example). These outputs are collectively referred to as the output of the control command.

The temperature regulator 15 performs heating/cooling operation (including stop operation) according to a control command given from the controller 32.

The reason why the "including stop operation" is additionally mentioned here is that the control command may probably include an operation stop command. In such a case, the temperature regulator 15 needs to stop the heating operation or cooling operation that has been performed thus far.

The temperature regulator 15 suffices if it has a function of performing cooling/heating operation (including stop operation) according to the control command as described above. Therefore, the embodiment of the function, namely, the configuration of the temperature regulator 15 is not particularly restrictive. For example, the temperature regulator 15 can be configured to include a cooling fan, a liquid cooling system, a heater, and the like.

The reason why the "including" is described is the following.

The incident light 21 from the light source 12 is a heat source. Unless the cooling operation is performed on the optical component 11, the optical component 11 rises in temperature. Therefore, the heating operation may sometimes suffice if the cooling operation of the temperature regulator 15 is stopped without positively giving the optical component 11 a heat source other than the incident light 21. In other words, the mere stop operation of the temperature regulator 15 may be employable as the heating operation in some cases. In such a case, the temperature regulator 15 can be composed of a single piece, such as a cooling fan having only a cooling function.

In contrast, it may sometimes be necessary to perform operation for positively giving the optical component 11 a heat source other than the incident light 21 as the heating operation in order to further enhance the degree of increased temperature of the optical component 11 or to accelerate a rise in temperature. In this case, a single piece, such as a cooling fan having only a cooling function would not be enough to constitute the temperature regulator 15. In this case, it is needed to add a device adapted to feed heated air to the cooling fan or the like (hereinafter, referred to as a heated air blower) to the temperature regulator 15 as one constituent element thereof. Specifically, to perform cooling operation, only the cooling fan or the like is operated and the operation of the heated air blower or the like is stopped. On the other hand, to perform heating operation, both the cooling fan or the like and the heated air blower or the like are operated. "Including" is described taking into account such a case.

The temperature regulator 15 can be composed of a device having both functions of heating and cooling, e.g., a Peltier device or the like.

The Peltier device is a device having the Peltier effect. The Peltier effect is a phenomenon in which when electric current flows through the junction between dissimilar conductors, e.g., p-type and n-type conductors, heat absorption occurs at the junction. The Peltier device is configured such that a plurality of p-type and n-type semiconductors are alternately joined on the respective opposed sides of a pair of substrates through a conductor. When the Peltier device is energized, that is, receives a predetermined positive voltage value as a drive voltage, one of the substrate sides (hereinafter, referred to as the A-side) becomes a heat-absorbing side and the other (hereinafter referred to as the B-side) becomes a heat-generating side. On the hand, when the Peltier device is given a polarity-reverse drive voltage, that is, a predetermined negative voltage value as a drive voltage, the A-side becomes a heat-generating side and B-side becomes a heat-absorbing side.

For example, if the optical component 11 is disposed close to the A-side of the Peltier device and the controller 32 gives a positive or negative voltage value as a control command, the temperature regulator 15 can composed of the Peltier device. In this case, if the positive voltage value is given as a control command to the Peltier device, the A-side of the Peltier device functions as the heat-absorbing side to absorb the heat of the optical component 11, that is, to perform the cooling operation. On the other hand, if the negative voltage value is given to the Peltier device, the A-side functions as the heat-generating side, which serves as the heat source relative to the optical component 11, thus, performing the heating operation. In this case, the temperature difference between the A-side and B-side of the Peltier device varies according to the magnitude of the drive voltage (the voltage value of the control command). Therefore, it is possible to change the degree of the cooling/heating operation, namely to strengthen or weaken the effect of cooling/heating by changing the positive or negative voltage value (absolute value) of the control command.

A configuration of another temperature control system different from that of FIG. 2 described above is illustrated in FIG. 4 by way of example. In other words, FIG. 4 illustrates another embodiment of the temperature control system to which the technique of the invention is applied and another configuration different from that of FIG. 2.

As described above, under the definition that a system refers to the entire apparatus composed of a plurality of processing devices and processing sections, also the temperature control system of FIG. 4 can be grasped as one temperature control apparatus.

However, although the temperature control system of FIG. 4 is another embodiment different from that of FIG. 2, their constituent elements themselves are the same as those of FIG. 2. A difference from the temperature control system of FIG. 2 is only the detection target light of the light quantity sensor 31.

The temperature control system of FIG. 4 employs, as the light based on the light source 12, leaking light 23 from the optical component 11 to which the incident light 21 is directed. In other words, a light quantity sensor 31 of FIG. 4 is installed at a site where a quantity of leaking light 23 is detectable.

Figure 5:
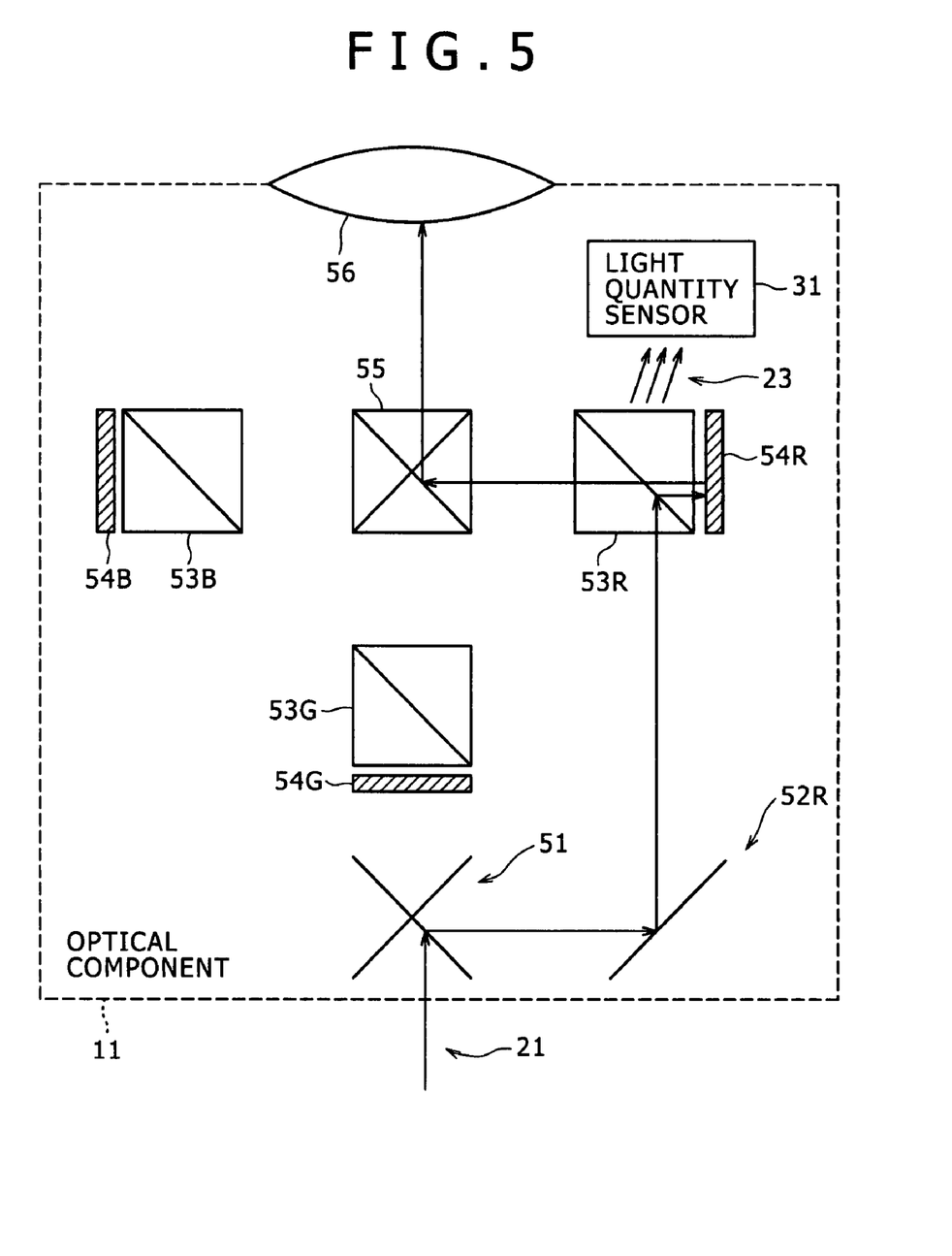
FIG. 5 illustrates an example of the arrangement position of a light quantity sensor of FIG. 4.

It is specifically assumed that an optical component of a digital cinema projector is employed as the optical component 11 as shown in FIG. 5. For simplification of the explanation, FIG. 5 mainly illustrates components for R-light of three primary colors of light (hereinafter referred to as R-light, G-light and B-light) and omits components for G-light and B-light. A description is below made focusing on a light path of the R-light. The light path of the R-light includes a reflection plate 51, a reflection plate 52R, a prism 53R, a reflective liquid crystal device 54R, a prism 53R, a prism 55 and a lens 56. The incident light 21 propagates along the light path of the R-light as described above and enters the lens 56 as R-light. In this case, the light quantity sensor 31 is disposed at a position on the periphery of the light path of the R-light, specifically, on the periphery of the prism 53R and reflective liquid crystal device 54R so as not to interfere with the incident light 21 (the R-light). In this way, the light quantity sensor 31 can detect the leaking light 23 from the prism 53R or the like.

The two examples, the example of FIG. 2 and the example of FIG. 4, have been described as the configurations of the embodiments of the temperature control system to which the present invention is applied.

Figure 6:
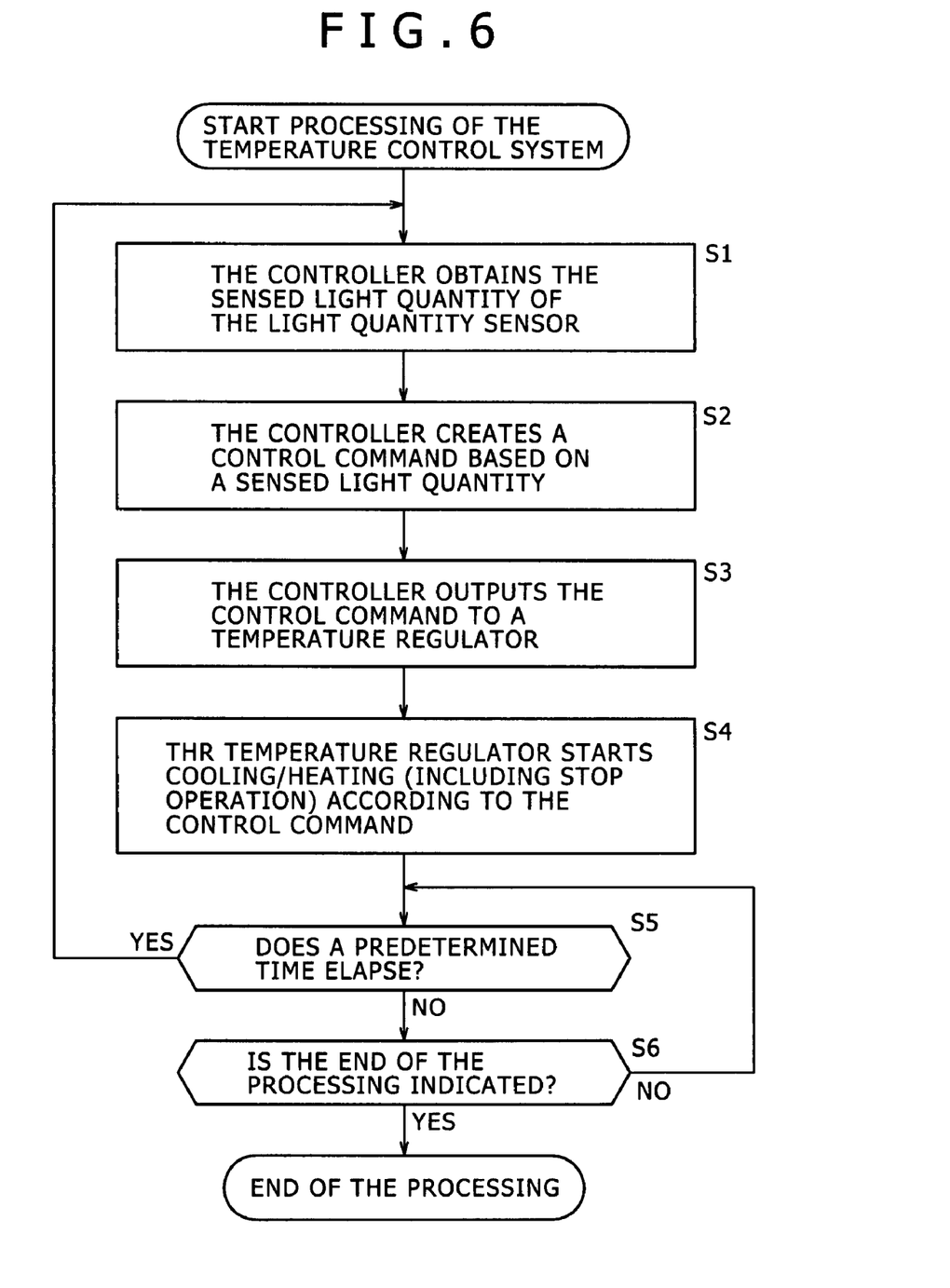
FIG. 6 is a flowchart for explaining processing of the temperature control sub-system of the temperature control systems of FIGS. 2 and 4.

A description is next made of processing of a temperature control sub-system included in the temperature control system configured as illustrated in FIG. 2 or 4 with reference to a flowchart of FIG. 6.

In step S1, the controller 32 obtains a quantity of light sensed by the light quantity sensor 31. In step S2, the controller 32 creates a control command on the basis of the sensed quantity of light. In step S3, the controller 32 outputs the control command to the temperature regulator 15.

In step S4, the temperature regulator 15 starts cooling/heating operation (including the stop operation) according to the control command.

In step S5, the controller 32 judges whether or not a predetermined time elapses.

If it is judged that the predetermined time does not elapse, a judgment is made as NO in step S5 and the processing proceeds to step S6. In step S6, the controller 32 judges whether or not the end of the processing is indicated.

In step S6, if it is judged that the end of the processing is indicated, the processing of the temperature control sub-system is ended.

In contrast, if it is judged that the end of the processing is not indicated in step S6, the processing is allowed to return to step S5, where it is judged again whether or not a predetermined time elapses. In other words, as long as the end of the processing is not indicated, the controller 32 repeats the loop processing of steps S5 and S6 until a predetermined time elapses. During repetition of the loop processing, the temperature regulator 15 maintains the performance of the cooling/heating operation (including the stop operation) started in the processing of step S4.

If the predetermined time elapses, a judgment is made as YES in the processing of step S5 and the processing is allowed to return to step S1. Then, step S1 and beyond are repeated. Every lapse of the predetermined time, a quantity of light sensed by the light quantity sensor 31 (a quantity of light based on the light source 12 at that point of time) is newly obtained. The regulating operation of the temperature regulator 15 is updated according to the sensed amount of light every such new obtainment (including the maintenance of the current operating state).

Incidentally, the predetermined time is not particularly restrictive and may be set at an optional time by a designer or the like. For example, time in one clock period or the like can be set as the predetermined time to exercise real time control or the like. However, if a sudden temperature change occurs in a liquid crystal device or the like in the optical component 11, a picture image created by the liquid crystal device or the like may deteriorate. It is inappropriate therefore to set the predetermined time at a too short time. In other words, in such a case, it is appropriate to set the predetermined time at time in seconds or in minutes for example. It is also possible to adopt a control pattern in which a command value varies with time as a control command instead of the single command value as mentioned above. In such a case, it is possible to adopt a control time (scheduled time from start to end) according to the control pattern as the predetermined time.

Incidentally, a series of the processing described above, namely, the processing of FIG. 6 can be executed by hardware as well as by software.

In this case, for example, a computer shown in FIG. 7 can be employed as at least part of the controller 32 or of the temperature regulator 15.

In FIG. 7, a CPU (Central Processing Unit) 101 performs various processing according to a program recorded in a ROM (Read Only Memory) 102 or a program loaded to a RAM (Random Access Memory) 103 from a memory section 108. The RAM 103 appropriately stores data to allow the CPU 101 to perform the various processing.

The CPU 101, ROM 102 and RAM 103 are interconnected by a bus 104. An input/output interface 105 is connected to the bus 104.

An input section 106 composed of a keyboard, a mouse and the like, an output section 107 composed of a display and the like, a memory section 108 composed of a hard disk and the like, a communication section 109 composed of a modem, a terminal adapter and the like are connected to the input/output interface 105. The communication section 109 controls communication with other devices (not shown) via a network including the Internet.

A drive 110 is connected to the input/output interface 105 according to need. A removable medium 111 such as a magnetic disk, an optical disk, a magnet-optical disk, or a semiconductor memory is attached to the drive 110. A computer program read from the removable medium 111 is installed in the memory section 108 according to need.

To perform a series of processing by software, a program constituting the software is installed from a network or a recording medium into a computer assembled into dedicated hardware or into e.g., a general-purpose personal computer which can perform various functions by various programs installed thereinto.

As shown in FIG. 7, a recording medium including such a program is constituted of the program-recorded removable media (package media) 111 which are separate from a device main body and are distributed to users to provide the program therefore. Examples of the removable media include a magnetic disk (including a floppy disk), an optical disk (CD-ROM (Compact Disk-Read Only Memory), DVD (Digital Versatile Disk)), a magnet-optical disk (MD (Mini-disk)), and a semiconductor memory. Alternatively, the recording medium is constituted of the program-recorded ROM 102, a hard disk included in the memory section 108, or the like, which is provided for the user in such a manner as to be preliminarily assembled in the device main body.

Incidentally, in the present specification, steps describing the program recorded in the recording medium include processing performed in chronological order, namely, in the order of the steps, as well as processing performed in parallel or individually, not necessarily in chronological order.

As described above, according to the embodiments of the present invention, when the temperature control for an optical component used for a projector or the like, a quantity of light based on the light source of the optical component can be used as a detected value.

In this case, the leaking light from the optical component or the unnecessary light generated by the light source can be employed as the light based on the light source; therefore, it is easy to detect the quantity of the light. Specifically, even if the optical component including the transmission type liquid crystal device or the PS conversion element whose temperature is difficult to measure is a control object, it is easy to detect the quantity of the light based on the light source. Thus, it is also possible to perform the temperature control on the control target.

As described above, the optical component including a nitric material component such as a prism has a difference in temperature between the near-center thereof on which light concentrates and the peripheral portion thereof whose temperature is detectable. Therefore, the existing temperature control using detected temperature is inappropriate for handling such an optical component as a control target. In contrast, the embodiments of the present invention can perform temperature control by using the quantity of light itself concentrating on the near-center or the quantity of light in close relation with the light quantity itself. Therefore, it is preferable to handle the optical component including the nitric material component such as a prism, as the control target.

As described above, the application of the present invention can make it possible to appropriately exercise temperature control on the optical component regardless of the types thereof.

Further, the temperature change of the optical component occurs mainly resulting from conversion of the incident light into heat and the degree of the temperature change varies depending on the quantity of incident light. The embodiments of the present invention uses, as a detected value, the light quantity which is the cause of the heat or of the temperature change. Thus, it is possible to construct a more direct temperature control sub-system, in turn, a temperature control sub-system to prevent the occurrence of heat.

The temperature control sub-system to prevent the occurrence of heat refers to a control system as below.

As described above, if an optical component is not subjected to any temperature control, incident light becomes a heat source, that is, heat is generated in the optical component, whose temperature excesses the optimum temperature. The occurrence of heat in the optical component basically shortens its operating life. Specifically, the higher the temperature is, or the longer the high temperature time is, the more the operating life of the optical component shortens. Thus, the optical component needs to maintain its internal temperature at the optimum temperature for as long period of time as possible during the operation thereof, namely, in the middle of the incidence of light in order to maintain its performance at a given level or more and increase its operating life by a given period of time or more.

Accordingly, it is desirable to exercise the temperature control on the optical component. The temperature control itself has been exercised in the past. However, as described with FIG. 1, the feedback control system which uses the temperature sensed by the temperature sensor different from the actual temperature of the optical component as a feedback value has been employed as the existing temperature control sub-system.

If an error (temperature difference) of the sensed temperature relative to a control target value is large, the feedback control system exercises heating/cooling operation at a degree according to the magnitude of the error. In other words, if the error is large, strong heating/cooling operation is performed according to the largeness of the error. If the error is small, the weak heating/cooling operation is performed according to the smallness of the error. For example, in the beginning when incident light is directed to the optical component from the light source, since the optical component has low temperature, an error is large with the result that strong heating operation is performed. In this case, the heat source including the incident light causes the optical component to generate heat, the temperature of the optical component increasingly rising.

It is assumed that response of control is fast (for example, the update frequency of a command value is fast and the degree of the change of the heating/cooling operation after the update is fast), appropriate gain or the like can be set, and consequently the temperature control sub-system that can exercise the so-called first-order lag control can be designed. The temperature control sub-system designed under this assumption sequentially performs appropriate control correction according to the change of the error. Thus, the temperature control sub-system can be brought into a stable state without occurrence of overshoot. More specifically, the detected temperature gradually comes close to and reaches the control target value without excess of the control target value. Thereafter, the detected temperature is maintained around the control target value.

However, as described above, if the temperature control having too fast response is exercised on the optical component such as a liquid crystal device or the like, image quality deterioration occurs. It is desirable, therefore, to exercise the temperature control having slow response to some extent. In this case, the control correction is delayed according to the change of the error lags. Consequently, after considerable overshoot occurs, namely, after the sensed temperature considerably exceeds the control target value, the control correction is performed. Since the error at this time is increased in a reverse direction, the control correction is made to perform the strong cooling operation. Consequently, considerable undershoot occurs at this time. In other words, the detected temperature is considerably below the control target value. Also thereafter, such control correction is repeated, and consequently, while the overshoot and undershoot are alternately repeated, the detected temperature comes close to the control target value. That is to say, its response waveform becomes a vibrational waveform equivalently obtained by the so-called high-order lag control. Incidentally, in some cases, the vibration increases and finally diverges, thus the temperature control becoming uncontrollable.

The state where the overshoot occurs is a state where the heat source including incident light causes the optical component to generate heat and have temperature in excess of the optimum temperature. If such a state where the overshoot occurs continues, the operating life of the optical component is shortened according to the period of time of the overshoot or to the magnitude of the overshoot.

The existing temperature control sub-system comes into a stable state if the sensed temperature of the temperature sensor is maintained at a control target value. However, the correlation between the sensed temperature (external temperature) and the temperature inside the optical component to be temperature-controlled (internal temperature) is not established in many cases. In such cases, even if the temperature control sub-system is controllably in a stable state, there is no guarantee that the inside of the optical component is maintained at the optimum temperature. More specifically, even if the existing temperature control sub-system is controllably in the stable state, the following is likely, in practice, to occur inside the optical component. Heat using the incident light as the heat source occurs, which causes the internal temperature to exceed the optimum temperature and continuously rise. Even if the internal temperature is maintained at a constant temperature, it is as high as in excess of the optimum temperature. Also such cases will shorten the operating life of the optical component.

As described above, it is very difficult for the existing temperature control sub-system to prevent the occurrence of heat which shortens the operating life of the optical component.

In contrast to this, the temperature control sub-system according to the embodiments of the present invention directly detects a quantity of light which is the cause of generating heat of the optical component and can make use of the sensed quantity of light for the temperature control of the optical component. Various conditions to exercise the appropriate first-order lag control can easily be grasped every quantity of incident light by performing the above-mentioned preliminary test or the like. The appropriate first-order lag control refers to temperature control without the occurrence of overshoot, namely, control in which the sensed light quantity does not exceed the control target value. Taking into account that the sensed light quantity is closely correlated with the internal temperature of the optical component, it is easy to prevent also the internal temperature of the optical component from exceeding the optimum temperature if the sensed light quantity does not exceed the control target value. In other words, it is easy to design a control target value to prevent the internal temperature of the optical component from exceeding the optimum temperature. To realize such temperature control, it is only needed to construct the temperature control sub-system according to the embodiments of the present invention so that the correlation between the various conditions and the quantity of light based on the incident light is grasped and a control command is created based on the correlation.

In short, the temperature control sub-system according to the embodiments of the present invention constructed as described above can exercise temperature control for preventing the occurrence of heat that otherwise allows the internal temperature of the optical component to exceed the optimum temperature. Consequently, the optical component can prevent the operating life of the optical component from being shortened. As described above, such a temperature control sub-system is a temperature control sub-system that prevents the occurrence of heat preliminarily and is an embodiment of the temperature control sub-system to which the present invention is applied.

It should be understood by those skilled in the art that various modifications, combinations, sub-combinations and alternations may occur depending on design requirements and other factors insofar as they are with in the scope of the appended claims or the equivalents thereof.

The invention claimed is:

1. A temperature control apparatus for controlling temperature of an optical component that operates upon receipt of light from a light source, comprising:
   a light quantity detector which detects a quantity of light based on the light source;
   a temperature regulator which performs regulating operation for regulating the temperature of the optical component on the basis of the light quantity detected by the light quantity detector; and
   a controller enabled to control the temperature regulator to perform the regulating operation from the light quantity detected by a single light quantity detector,
   wherein the light quantity detector is operable to detect a quantity of unnecessary light generated by the light source or a quantity of light leaking from the optical component on which light from the light source is incident, as the quantity of light based on the light source.

2. The temperature control apparatus according to claim 1, wherein:
   the controller creates a control command for the temperature regulator on the basis of the light quantity detected by the light quantity detector according to a predetermined control principle using the quantity of light based on the light source;
   wherein the temperature regulator performs the regulating operation according to the control command issued from the controller.

3. The temperature control apparatus according to claim 1, wherein the temperature regulator is composed of a Peltier device having both functions of heating and cooling.

4. A temperature control method for a temperature control apparatus for controlling temperature of an optical component that operates upon receipt of light from a light source, comprising:
   detecting a quantity of light based on the light source;
   regulating the temperature of the optical component on the basis of the light quantity detected; and
   controlling the temperature regulator to perform the regulating operation from the light quantity detected by a single light quantity detector,
   wherein the quantity of light based on the light source to be detected is a quantity of unnecessary light generated by the light source or a quantity of light leaking from the optical component on which light from the light source is incident.

5. A computer readable medium having a program executable by a computer which exercises control on a temperature regulator which performs regulating operation for regulating temperature of an optical component which operates upon receipt of light from a light source, comprising:

obtaining a light quantity detected by a light quantity detector for detecting a quantity of light based on the light source; and controlling the regulating operation of the temperature regulator on the basis of the light quantity obtained, wherein the controlling is enabled to perform the regulating operation from the light quantity detected by a single light quantity detector, wherein the quantity of light based on the light source to be detected is a quantity of unnecessary light generated by the light source or a quantity of light leaking from the optical component on which light from the light source is incident.

6. The temperature control apparatus of claim 1 wherein the light quantity detector detects a quantity of light emanating from a prism through which light from the light source is incident.

* * * * *